March 24, 1959  L. R. NETHERTON ET AL  2,878,612
FISH LURE
Filed Oct. 25, 1957
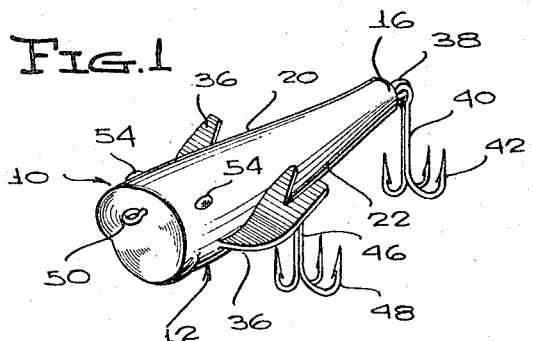
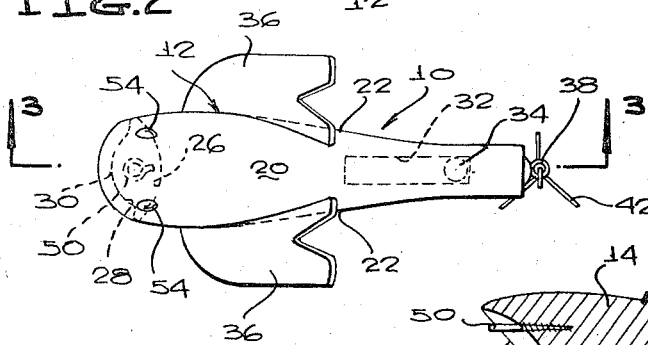
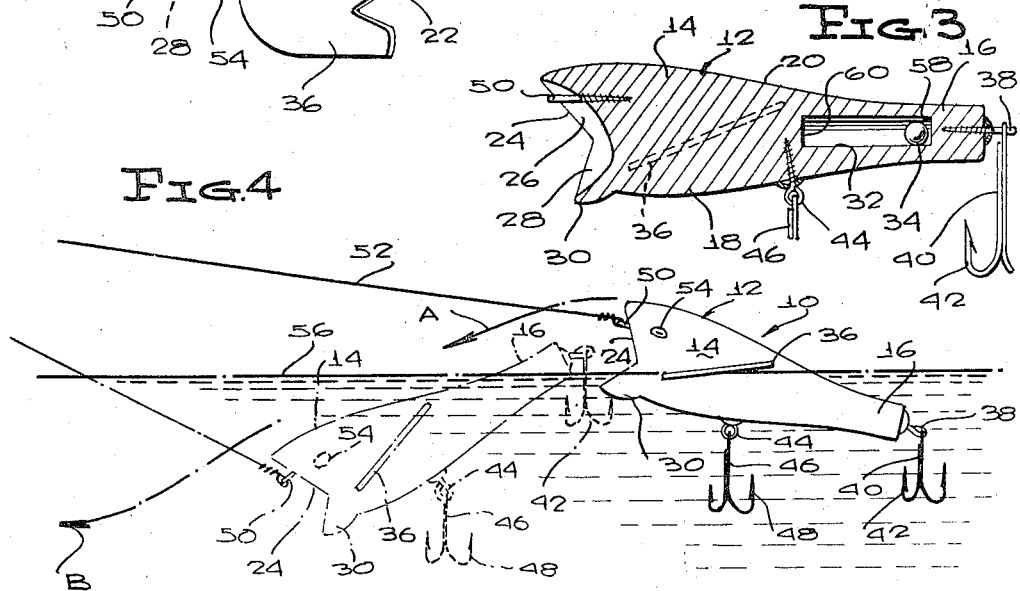
INVENTORS
LYMAN R. NETHERTON
& JESSE G. BAKER
BY
McMorrow, Berman & Davidson
ATTORNEYS

United States Patent Office 2,878,612
Patented Mar. 24, 1959

2,878,612

FISH LURE

Lyman R. Netherton and Jesse G. Baker,
River Rouge, Mich.

Application October 25, 1957, Serial No. 692,338

2 Claims. (Cl. 43—42.31)

This invention relates to lures and, more specifically, to a new and improved fishing lure.

One of the primary objects of this invention is to provide a fishing lure which is so constructed as to have the appearance and action of live bait whether the lure is floating on the surface of the water or whether the lure is submerged shallowly or deeply.

Another object of this invention is to provide a fishing lure for casting or trolling, of the type generally referred to above, together with means for producing a noise.

A further object of this invention is to provide a fishing lure, of the type described above, with depth control means whereby the fisherman may maintain the lure on the surface of the water or at any desired depth therebelow.

Still another object of this invention is to provide a fishing lure with means for producing a noise or for setting up vibrations in the water for attracting fish to the lure, the aforesaid means also serving as a ballast for the lure.

This invention contemplates, as still another object thereof, the provision of a fishing lure of the type generally referred to supra, the lure being non-complex in construction and assembly, inexpensive to manufacture, and durable in use.

Other and further objects and advantages of the instant invention will become more evident from a consideration of the following specification when read in conjunction with the annexed drawing, in which:

Figure 1 is a perspective view of a fishing lure constructed in accordance with the present invention;

Figure 2 is a top plan view of the fishing lure illustrated in Figure 1;

Figure 3 is a longitudinal detail cross-sectional view taken substantially on the horizontal plane of line 3—3 of Figure 2, looking in the direction of the arrows; and, Figure 4 illustrates, in full lines, the fishing lure as being trolled over the surface of a body of water, and the phantom line illustration thereof illustrates the action of the lure as it is being submerged.

Referring now more specifically to the drawing, reference numeral 10 designates, in general, a fishing lure constructed in accordance with the teachings of the instant invention. As is illustrated in the several figures, the fishing lure 10 may be constructed of wood, plastics, metal or of any other desirable materials.

The lure 10 is seen to comprise a solid main body 12 having a forward end portion 14 and a rear end portion 16. The forward end portion 14 is substantially ovate in transverse cross-sectional configuration, and the rear end portion 16 is substantially cylindrical in transverse cross-sectional configuration. As is clearly seen in the drawings, the bottom of the inner end of the forward end portion 14 merges with the inner end of the rear end portion 16 along a generally curved surface 18, whereas the top and side members 20, 22, respectively, taper inwardly towards the inner end of the rear end portion 16 at a sharper angle (see Figures 2, 3 and 4).

The upper part of the outer end of a forward end portion 16 is undercut to form a lip 24 provided with a concave surface 26 which merges at its inner end with the inner end of a concave surface 28 formed in a lip 30 extending from the main body portion 12. As is seen in Figures 2 and 3, the outer end of the lip 24 overhangs and projects beyond the outer end of the lip 30.

Disposed within the rear end portion 16 and extending partially into the forward end portion 14 is an elongated substantially hollow cylindrical cavity 32 in which is loosely disposed a solid spherical member 34.

Secured to each side 22, respectively, of the main body portion 12 are a pair of fins 36 which project laterally therefrom and which are inclined upwardly from their respective lower ends to their respective upper ends.

An eye screw 38 projects longitudinally from the outer end of the rear end portion 16 to provide means for swingably connecting the shank 40 of a fishhook 42 thereto. A similar eye screw 44 penetrates the underside of the main body portion 12 substantially at the junction of the inner end of the front and rear end portions 14, 16, respectively, to provide means for swingably connecting the shank 46 of a second fishhook 48 thereto. A third eyescrew 50 penetrates the lip 24 and the forward end of the front body portion 14 and serves as means for connecting the fishing line 52 to the lure 10.

The lure 10 is formed with a protuberance 54 at each side thereof to simulate the eyes of a fish. The main body portion 12 of the lure 10 may be painted or enameled in any desirable color or color combinations.

Referring now to Figure 4 of the drawing, the full line illustration of the lure 10 shows the same as floating on a body of water 56 and as being towed on the line 52. The fisherman (not shown) can, by swinging the line from side to side, cause the lure to move in corresponding directions, and, by sharply jerking of the line 52, cause the lip 50 to pivot in the direction of the arrow A whereby the forward lower ends of the fins are submerged in the water 56 to effect a diving movement of the lure 10 to a desired depth. Continued jerking of the line 10 causes the sphere 34 to strike the opposed ends 58, 60 of the cavity 32 under the force of inertia thereby setting up a clicking noise or vibration in the water 56 to draw the attention of the fish thereto.

The sphere 34 and the cavity 32 are so positioned as to permit the sphere 34 to also act as a ballast whereby the lure 10 is balanced in such a manner that after the lure 10 has reached the desired depth and no further jerks are imparted thereto, the lure 10 begins to glide to the surface of the water as indicated by the arrow B. This is due, of course, to the tension on the line 52 which pulls the lip 24 upwardly whereby the spherical member, under the force of gravity, impinges against the end 58 of the cavity 32, both actions effecting a change in the center of gravity of the lure 10 to reverse the angle of inclination of the fins 36.

Having described and illustrated one embodiment of this invention in detail, it will be understood that the same is offered merely by way of example, and that this invention is to be limited only by the scope of the appended claims.

What is claimed is:

1. A fishing lure comprising an elongated solid main body having integrally connected forward and rear end portions, said forward end portions being substantially ovate in transverse cross-sectional configuration and said rear end portion being substantially cylindrical in transverse cross-sectional configuration; the outer end of said forward body portion being provided with a substantially concave surface projecting inwardly therefrom; said rear body portion being provided with an elongated substantially hollow cylindrical cavity having a pair of opposed closed ends; a spherical member disposed for reciprocation within said cavity; a fin fixedly secured to each side of said forward end portion and extending laterally therefrom; a first eye member secured to the outer end of said rear body portion and projecting longitudinally therebeyond; a first fishhook; means on said hook swingably connecting said hook to said first eye; a second eye member secured at substantially the lower center of said main body and projecting therefrom; a second fishhook; means on said second hook swingably connecting said second hook to said second eye; a third eye member secured to said forward end portion and projecting longitudinally from said concave end surface thereof for connection with one end of a fishing line.

2. A fishing lure comprising an elongated substantially solid main body having integrally connected front and rear end portions, said front and rear end portions having a substantially continuous underside, said front end portion being substantially ovate in transverse cross-sectional configuration and said rear end portion being substantially cylindrical in transverse cross-sectional configuration, said front end portion having an undercut lip at the outer end thereof, said lip having a concave surface extending inwardly therefrom, said rear end portion having an elongated longitudinally extending substantially hollow cylindrical cavity formed therein and extending partially into said front end portion, said cavity having a pair of opposed closed ends, means disposed for reciprocation within said cavity for striking said opposed ends under the influence of the force of inertia for creating a noise or for setting up vibration in a body of water, a first fishhook, means swingably connecting said first hook to the outer end of said rear end portion, a second fishhook, means swingably connecting said second hook to said main body intermediate the ends of said continuous underside, means extending outwardly from said undercut lip for connection with one end of a fishing line, and a fin projecting laterally from each side of said front body portion, each of said fins being inclined rearwardly from their respective lower ends to their respective upper ends.

References Cited in the file of this patent

UNITED STATES PATENTS

| | | |
|---|---|---|
| 1,114,137 | Heddon | Oct. 20, 1914 |
| 1,272,003 | Cameron | July 9, 1918 |
| 2,270,487 | Withey | Jan. 20, 1942 |
| 2,344,580 | Wood | Mar. 21, 1944 |